W. P. LOUDON.
RELIEF MECHANISM FOR STORAGE BATTERIES.
APPLICATION FILED JAN. 7, 1918.

1,363,606.

Patented Dec. 28, 1920.

WITNESS:
Romaine A. Kinne
Ralph V'unden

INVENTOR.
Warren P. Loudon
BY
Raymond H Van Vleet
ATTORNEY.

UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

RELIEF MECHANISM FOR STORAGE BATTERIES.

1,363,606.   Specification of Letters Patent.   Patented Dec. 28, 1920.

Application filed January 7, 1918. Serial No. 210,748.

*To all whom it may concern:*

Be it known that I, WARREN P. LOUDON, a citizen of the United States, residing at Niagara Falls, in the county of Niagara and State of New York, have invented new and useful Improvements in Relief Mechanism for Storage Batteries, of which the following is a specification.

The present invention relates to relief mechanism for storage batteries.

More particularly the present invention relates to mechanism whereby the gas may escape from the interior of the storage battery cell but which will prevent the escape of the electrolyte though the cell be tipped at a great angle or turned up-side-down.

The invention is particularly applicable to portable storage batteries or storage batteries used in aeroplanes, which are carried at a great variety of angles.

An object of the present invention is to provide a relief mechanism which will permit the escape of gases from the interior of the storage battery cell but which will effectually seal said cell to prevent the escape of electrolyte if the cell should be tipped at such an angle that the electrolyte would tend to escape.

A further object is to provide relief mechanism of the kind referred to which is cheap to manufacture, sturdy in construction and infallible in operation.

Further objects will be apparent as the description proceeds.

Referring to the drawings:—

Figure 3:
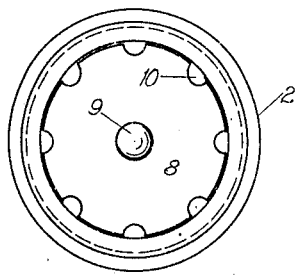
Figs. 2 and 3 represent plan views of the mechanism with parts removed.

A part of the cover of a storage battery cell is indicated by the numeral 1. Extending upwardly from said cover 1 is a collar 2, which collar surrounds an aperture 3 communicating with the interior of the cell. Within the collar 2 are three or more circumferentially spaced wedge-shaped portions 4 which provide radiating guide-ways extending from the center to the periphery of the space within said collar. Said guide-ways have inclined bottoms which rise from the periphery toward the center of the space within said collar. Each of the radial guide-ways is indicated by the numeral 5.

Figure 2:
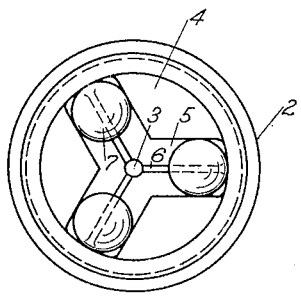
Figure 1:
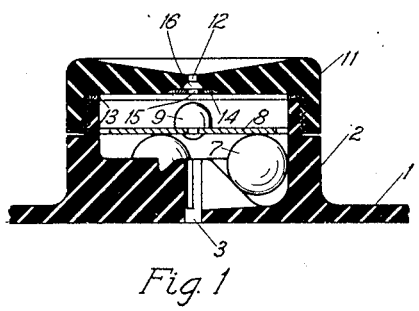
Figure 1 represents a sectional view of one embodiment of the present invention.

There is thus formed in the space within the collar 2 a formation which may be described as being in the general form of the frustum of a cone provided with wedge-shaped portions to form the radial guide-ways 5. Said frustum of a cone is provided with radial slits 6 communicating with the aperture 3, as clearly indicated in Figs. 1 and 2. The slits 6 should be inclined toward the aperture 3 and should be of sufficient size to readily permit the passage of the electrolyte. Or, if desired, holes may be provided through the cover 1 at the outer ends of the guide-ways 5.

Mounted within each of the guide-ways 5 is a ball 7, preferably of lead. The several balls will be preferably of the same size. Mounted upon said balls 7 is a diaphragm 8 upon which is mounted a button 9. The diaphragm 8 is provided with a plurality of circumferentially-placed fillets 10. Said diaphragm should loosely fit within the collar 2. The member 8 may take other forms than a diaphragm, so long as the function is preserved of contacting with and being operable by the balls 7.

Mounted upon the collar 2 is a cap 11 provided with a central aperture 12. Said cap 11 may have screw-threaded engagement with the collar 2 and may be sealed thereto by means of the gasket 13. Mounted on the inside of the cap 11 is a gasket 14 provided with a central aperture 15. This aperture 15 should be in juxtaposition to the button 9. The collar 11 is cored out immediately above the gasket 14 to form a space having a conical wall 16. This conical wall 16 forms a seat against which the gasket 14 may rest.

The collar 2 has been illustrated as being integral with the cover 1. It will be understood, however, that such integral construction is not necessary and that the mechanism bounded by the collar 2 may be made separately from the cover and mounted thereon by means of screw-threads or in any other preferred manner, providing thereby a filler cap in the same mechanism. Furthermore, the members 7 need not be balls, but may be any type of roller or may be mere sliding members moving in the guide-ways 5.

A mode of operation of the above-described embodiment of the invention will be substantially as follows. When the storage battery cell, to which the present invention is applied, is occupying an upright position, gases which are evolved within said cell may escape through aperture 3, through fillets 10 in the diaphragm 8, thence through aperture 15 in the gasket 14, through aperture 12, to the atmosphere. If the cell is tilted to a predetermined angle, one or more of the balls 7 will roll along its corresponding guide-way toward the center of the space within the collar 2. In so rolling toward the center, said ball or balls 7 will force the diaphragm 8 toward the cap. The diaphragm 8 will fulcrum about one or more of the balls 7 and the button 9 will be forced against the gasket 14, closing the aperture 15 in said gasket 14. The conical wall 16 will form a convenient seat for the gasket 14. Escape of the electrolyte will thus be effectually prevented, regardless of the angle at which the cell may be turned.

Any acid which collects upon the diaphragm 8 will readily flow through the fillets 10 and slits 6, back into the interior of the cell through the aperture 3.

The angle at which the bottoms of the guide-ways 5 are inclined, may be chosen as desired.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is:—

1. In relief mechanism, in combination, members forming a chamber, said members forming inclined means within said chamber, roller means cooperating with said inclined means, and valve-closing means controlled by said roller means, said roller means being mounted to move said valve closing means to closing position when said relief mechanism is tilted to a predetermined angle.

2. In relief mechanism, in combination, valve-closing means, means for operating said closing means, a plurality of rollers for controlling said operating means, said rollers operating along equally spaced radii.

3. In relief mechanism, in combination, valve-closing means, means for operating said closing means, a plurality of rollers for controlling said operating means, said rollers operating along equally spaced radii, said operating means being adapted to fulcrum on one or more of said rollers.

4. In relief mechanism, in combination, valve-closing means and roller means adapted upon the tilting of said mechanism to a predetermined degree to wedge said valve-closing means to closing position.

5. In relief mechanism, a member forming radiating guide-ways, roller means located in said guide-ways, and valve closing means adapted to be operated by said roller means when said mechanism is tilted to a predetermined degree.

6. In combination, a cell cover, members mounted thereon having a passage-way leading to the underside of said cover and a second passage-way leading to the outside atmosphere, means within said chamber forming radiating guide-ways, means within said chamber for closing said second passage-way, and operating means for said closing means located in said guide-ways.

7. In relief mechanism, in combination, members forming radiating runways, movable members in said runways, valve-closing means, said movable members being adapted to act as fulcrum means or as operating means for said valve-closing means.

8. In relief mechanism, in combination, members forming radiating runways, movable members in said runways, valve-closing means, said members being adapted to operate said valve-closing means.

In witness whereof, I have hereunto subscribed my name.

WARREN P. LOUDON.